US009920730B2

(12) United States Patent
Schaumberger et al.

(10) Patent No.: US 9,920,730 B2
(45) Date of Patent: Mar. 20, 2018

(54) METHOD OF STARTING AN INTERNAL COMBUSTION ENGINE

(71) Applicant: GE Jenbacher GmbH & Co OG, Jenbach (AT)

(72) Inventors: Herbert Schaumberger, Muenster (AT); Nikolaus Spyra, Innsbruck (AT); Francisco Lopez, Innsbruck (AT)

(73) Assignee: GE Jenbacher GmbH CO OG (AT)

( * ) Notice: Subject to any disclaimer, the term of this patent is extended or adjusted under 35 U.S.C. 154(b) by 154 days.

(21) Appl. No.: 14/820,973

(22) Filed: Aug. 7, 2015

(65) Prior Publication Data

US 2016/0061170 A1 Mar. 3, 2016

(30) Foreign Application Priority Data

Sep. 3, 2014 (AT) .................................. A 676/2014

(51) Int. Cl.
*F02N 11/08* (2006.01)
*F02N 11/10* (2006.01)
(Continued)

(52) U.S. Cl.
CPC .......... *F02N 11/08* (2013.01); *F02N 11/0848* (2013.01); *F02N 11/106* (2013.01);
(Continued)

(58) Field of Classification Search
CPC .... F02N 11/08; F02N 11/0848; F02N 11/106; F02N 2200/022; F02N 2200/041; F02B 2075/1832; F02D 17/02; F02D 2200/0411
See application file for complete search history.

(56) References Cited

U.S. PATENT DOCUMENTS 6,700,212 B2 * 3/2004 Ackermann ............ F02N 11/04 290/36 R
7,628,138 B2 * 12/2009 Ando .................... F02D 41/009 123/179.3

(Continued)

FOREIGN PATENT DOCUMENTS

DE 101 01 007 8/2002
DE 10 2007 025 692 1/2008

(Continued)

OTHER PUBLICATIONS

Austrian Search Report dated Mar. 19, 2015 in corresponding Austrian Patent Application No. A 676/2014 (with English translation).

(Continued)

*Primary Examiner* — Joseph Dallo
(74) *Attorney, Agent, or Firm* — GE Global Patent Operation; Rita D. Vacca

(57) ABSTRACT

In a method of starting an internal combustion engine having a plurality of piston-cylinder units wherein there are dead volumes upstream of the piston-cylinder units, wherein upon an attempt at starting the internal combustion engine, the pistons are driven in the cylinders by an auxiliary motor. The maximum permissible duration of a starting attempt is restricted by a predetermined starting time ($t_s$) of the internal combustion engine. The starting time ($t_s$) is calculated and predetermined prior to or at the beginning of a starting attempt of the internal combustion engine depending on a state of the internal combustion engine and/or the auxiliary motor.

5 Claims, 3 Drawing Sheets

(51) Int. Cl.
*F02D 17/02* (2006.01)
*F02B 75/18* (2006.01)

(52) U.S. Cl.
CPC ...... *F02B 2075/1832* (2013.01); *F02D 17/02* (2013.01); *F02D 2200/0411* (2013.01); *F02N 2200/022* (2013.01); *F02N 2200/041* (2013.01)

(56) References Cited

U.S. PATENT DOCUMENTS

| | | | | |
|---|---|---|---|---|
| 7,654,247 | B2 * | 2/2010 | Shiraishi | F02D 31/002 123/403 |
| 9,399,977 | B2 * | 7/2016 | Woelfl | H02P 7/29 |
| 2002/0124825 | A1 | 9/2002 | Ackermann et al. | |
| 2005/0205064 | A1 * | 9/2005 | Lewis | F01L 13/0005 123/437 |
| 2006/0254564 | A1 * | 11/2006 | Lewis | F01L 9/04 123/491 |
| 2007/0113820 | A1 * | 5/2007 | Hartmann | F02D 17/02 123/198 F |
| 2007/0246012 | A1 | 10/2007 | Ando | |
| 2009/0071438 | A1 * | 3/2009 | Shiraishi | F02D 31/002 123/403 |
| 2011/0196570 | A1 | 8/2011 | Nakamura | |
| 2012/0209501 | A1 | 8/2012 | Tumback et al. | |
| 2013/0041572 | A1 * | 2/2013 | Cwik | F02N 11/0855 701/113 |
| 2014/0048031 | A1 * | 2/2014 | Woelfl | H02P 7/29 123/179.28 |

FOREIGN PATENT DOCUMENTS

| | | |
|---|---|---|
| DE | 10 2008 043 555 | 5/2010 |
| DE | 10 2009 029 207 | 3/2011 |
| DE | 10 2010 056 505 | 7/2012 |
| DE | 10 2011 007 874 | 10/2012 |
| EP | 1 221 553 | 7/2002 |
| EP | 1 406 009 | 4/2004 |
| EP | 1 849 982 | 10/2007 |
| FR | 2 964 157 | 3/2012 |
| JP | 9-209887 | 8/1997 |
| JP | 11-148397 | 6/1999 |
| JP | 2007-2812 | 1/2007 |
| JP | 2008-51014 | 3/2008 |
| JP | 2008-168740 | 7/2008 |
| JP | 2011-185260 | 9/2011 |
| JP | 2013-64385 | 4/2013 |
| JP | 2014-114701 | 6/2014 |
| WO | 2012/028805 | 3/2012 |

OTHER PUBLICATIONS

European Search Report dated Jan. 13, 2016 in corresponding European Application No. 15002291 (with English translation).

* cited by examiner

METHOD OF STARTING AN INTERNAL COMBUSTION ENGINE

BACKGROUND OF THE INVENTION

The invention concerns a method of starting an internal combustion engine.

Starting internal combustion engines, in particular stationary internal combustion engines, represents a high stress on the components involved. When starting an internal combustion engine generally, a gear, the starter pinion, driven by an auxiliary motor, engages into a gear ring connected to the crankshaft of the internal combustion engine and accelerates the internal combustion engine to a speed of revolution thereof, at which the engine can automatically run. The loading involved concerns the mechanical components and in particular the auxiliary motor. In the case of electric auxiliary motors, these are the electric windings and the starter battery.

An aspect which is relevant to safety is that, during the starting procedure, combustible mixture is pumped into the exhaust manifold and thus the risk of flash fires increases with the duration of the starting procedure.

It is therefore usual for the above-indicated reasons for the maximum permissible duration of a starting procedure to be restricted by a predetermined time.

A disadvantage with starting procedures according to the state of the art is that unsuccessful attempts at starting are frequent, that is to say attempts at starting which do not lead to the internal combustion engine automatically running.

SUMMARY OF THE INVENTION

The object of the present invention is to provide a starting method by which the probability of succeeding with an attempt at starting is increased in comparison with the state of the art.

Therefore the fact the starting time is calculated and predetermined prior to or at the beginning of a starting attempt of the internal combustion engine depending on a state of the internal combustion engine and/or the auxiliary motor provides that the probability of succeeding with an attempt at starting is markedly increased. The expression success with an attempt at starting is used to mean that the internal combustion engine begins to run automatically due to the starting attempt.

In that way, the mechanical and electrical components involved in the starting process are less heavily stressed and achieve a longer service life than with starting methods in accordance with the state of the art as in the state of the art unsuccessful starting attempts occur more frequently than with the method according to the invention.

Therefore, taking account of a state of the internal combustion engine and/or the auxiliary motor for establishing the set starting time provides for establishing a starting time which is adapted to the state of the internal combustion engine and/or the auxiliary motor.

The starting time corresponds to that time required until a combustible mixture is present in all cylinders. An excessively long starting time signifies an increased risk of flash fires as unburnt mixture escapes into the exhaust manifold. An excessively short starting time would have the consequence that not all cylinders are reached by ignitable mixture. The advantages of the proposed method lie in the reduction of the flash fire risk, enhanced probability of success with the starting process and the reduced loading on the auxiliary motor and possibly the batteries, which increases the service life thereof.

It can preferably be provided that if the rotary speed of the internal combustion engine has not reached or exceeded the starting rotary speed after expiration of the set starting time, the starting attempt is broken off (stopped).

The starting rotary speed of the internal combustion engine is that speed at which the internal combustion engine begins at the earliest to run on its own.

A check is therefore made to ascertain whether, after the predetermined starting time is reached, the speed of the internal combustion engine has also actually reached the starting speed. If the starting speed is not reached in the starting attempt being considered, then that starting attempt is broken off. Breaking off the starting attempt signifies at least switching off the auxiliary motor. A further sensible measure when breaking off the starting attempt is to shut down the fuel feed devices like, for example, gas valves so that fuel does not continue to be sucked in and discharged unburnt.

Preferably, the starting time is predetermined depending on the size of the dead volumes. The term dead volumes is used to mean those volumes which are present between the combustion chambers and a fuel metering device or mixing device arranged upstream of the combustion chambers.

During a starting process, the dead volumes must be emptied by the pump action of the piston-cylinder units of the internal combustion engine until the cylinders are filled with combustible mixture. Before the majority of the piston-cylinder units are not filled with combustible mixture, a starting process cannot be successful. Thus taking account of the size of the dead volumes in determining the starting time is a contribution to increasing the probability of succeeding with a starting attempt.

Particularly preferably, the starting time is predetermined
- depending on a rotary speed of the auxiliary motor and/or
- depending on the number of cylinders of the internal combustion engine and/or
- depending on the swept volume of the piston-cylinder units and/or
- depending on the volumetric efficiency of the internal combustion engine.

BRIEF DESCRIPTION OF THE DRAWINGS

The invention is described in greater detail hereinafter with reference to the Figures, in which.

DETAILED DESCRIPTION OF THE INVENTION

Figure 1:
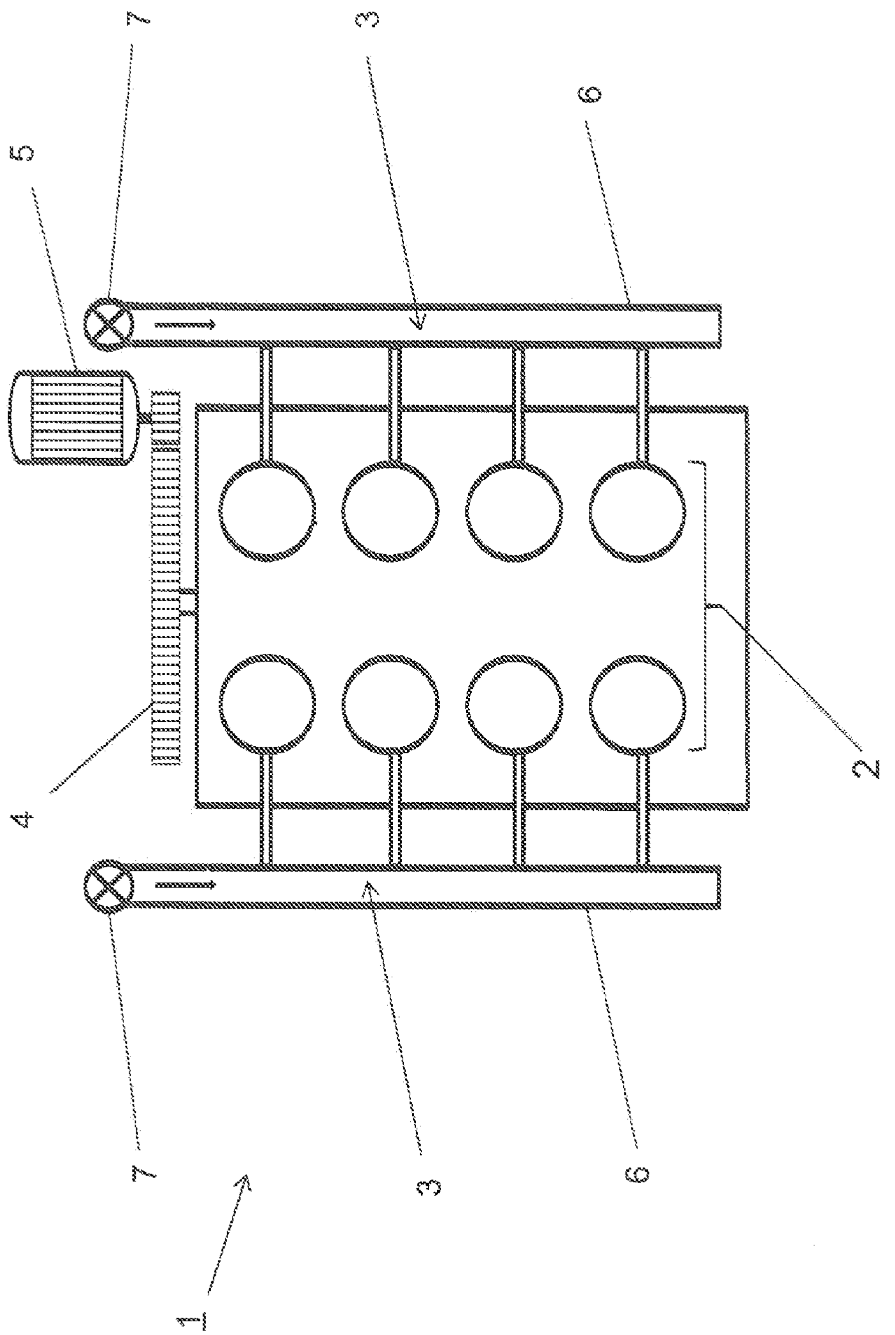
FIG. 1 shows a diagrammatic view of an internal combustion engine with auxiliary motor.

FIG. 1 is a diagrammatic view showing an internal combustion engine 1 having a plurality of piston-cylinder units 2. The piston-cylinder units 2 of the internal combustion engine 1 are supplied with fuel-air mixture by way of the induction manifold 6. The flow of fuel-air mixture into the induction manifold 6 is symbolically indicated by arrows. The fuel feed device 7 meteredly supplies fuel.

The fuel feed device 7 can be, for example, a gas mixer, a metering valve or any other usual feed device for fuel.

Also shown is an auxiliary motor 5 (starter motor) connected to the crankshaft of the internal combustion engine 1 by the starter ring 4. The auxiliary motor 5 can be driven electrically or pneumatically. In the case of an electric drive, starter batteries are usually provided as energy storage means. In the case of a pneumatic starter motor, a compressed air storage means serves as the energy supply.

In the starting process, a pinion of the auxiliary motor 5 engages into the starter ring 4 and accelerates the internal combustion engine 1 until it begins to run on its own. During the starting process, the piston-cylinder units 2 demand gas or mixture from the induction manifold 6.

Those portions of the induction manifold 6 that are between the piston-cylinder units 2 and the fuel feed device 7 are referred to in the present application as dead volumes 3. In a starting process, after metering of fuel by the fuel feed device, the dead volumes 3 first have to be flooded with fuel-air mixture before the fuel-air mixture reaches the piston-cylinder units 2.

The dead volumes 3 together with the throughput per revolution of the internal combustion engine 1 cause a delay in transport of the fuel-air mixture into the piston-cylinder units 2. The consequence of this is that, during a starting process, there is combustible mixture in the piston-cylinder units 2 only after a certain time. That time derives from the throughput of the piston-cylinder units 2, the rotary speed of the internal combustion engine 1, that is determined by the speed of the auxiliary motor 5, and the size of the dead volumes 3. A suitable measure in terms of describing the pump effect (throughput) of the piston-cylinder units is the volumetric efficiency which specifies how much fresh charge is available in relation to the theoretically maximum possible filling after the conclusion of a charge exchange in the cylinder.

The higher the starting speed, the correspondingly more quickly are the dead volumes 3 pumped out. The greater the number of cylinders, then the correspondingly quicker are the dead volumes 3 pumped out—with a given starting rotary speed. A larger swept volume of the piston-cylinder units 2—with a given starting speed and a given number of cylinders—provides for the dead volumes 3 to be more quickly pumped out.

Figure 2:
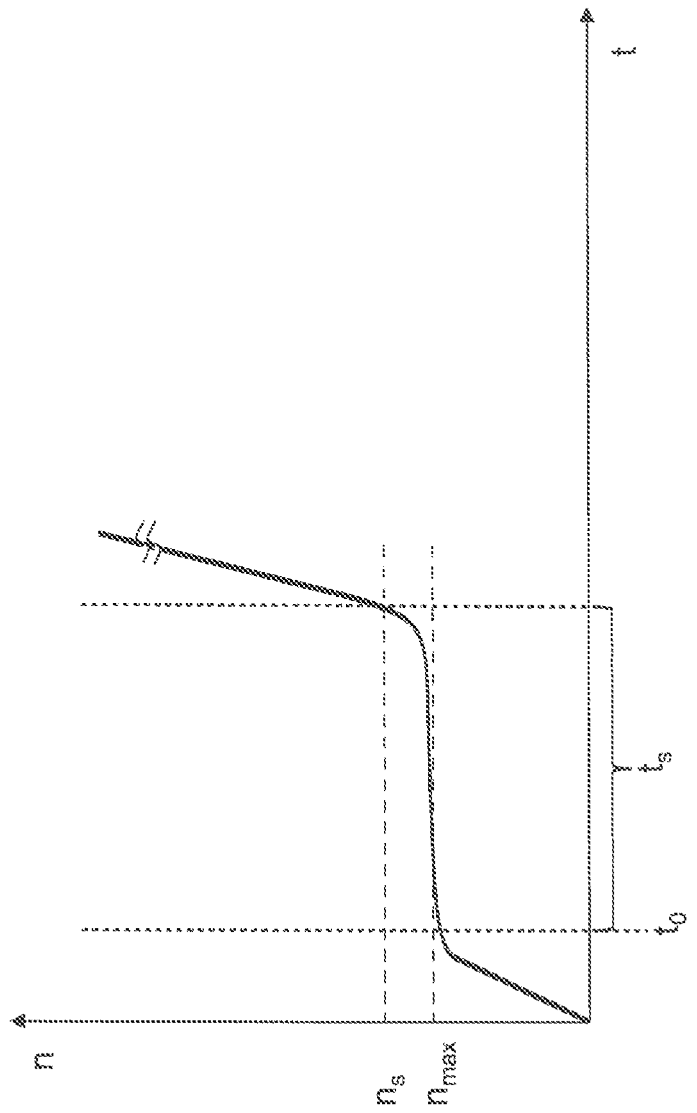
FIG. 2 shows a diagrammatic graph of rotary speed in relation to time during a starting process.

FIG. 2 shows a graph of the rotary speed n of the internal combustion engine 1 on the Y-axis, plotted against time t on the X-axis. The graph shows a typical variation in rotary speed of the internal combustion engine 1 during a starting process. It will be seen therefore that, after acceleration of the internal combustion engine 1 by the auxiliary motor 5 to the maximum starter speed $n_{max}$ (here for example 180 revolutions per minute), the starting process is performed until the starting speed $n_s$ of the internal combustion engine 1 is reached.

The maximum starter speed $n_{max}$ is determined by the power of the auxiliary motor 5, the charge condition of starter batteries (in the case of an electrical auxiliary motor), oil temperature and frictional conditions.

The starting speed $n_s$ of the internal combustion engine 1 is that rotary speed at which the internal combustion engine 1 begins at the earliest to run on its own.

At time $t_0$ the auxiliary motor 5 has accelerated the internal combustion engine 1 to the maximum starter speed $n_{max}$. The starting time $t_s$ specifies how long the internal combustion engine 1 is held at $n_{max}$ before it begins to run on its own and reaches the starting speed $n_s$.

The maximum starter speed $n_{max}$ is that rotary speed of the internal combustion engine 1, at which the auxiliary motor 5 holds the internal combustion engine 1 during the starting process. As soon as the internal combustion engine 1 produces power of its own by combustion in the piston-cylinder units 2, the internal combustion engine 1 further accelerates. When the internal combustion engine 1 reaches the starting speed $n_s$ by virtue of combustion in the piston-cylinder units 2, the starter disengages.

Figure 3A:
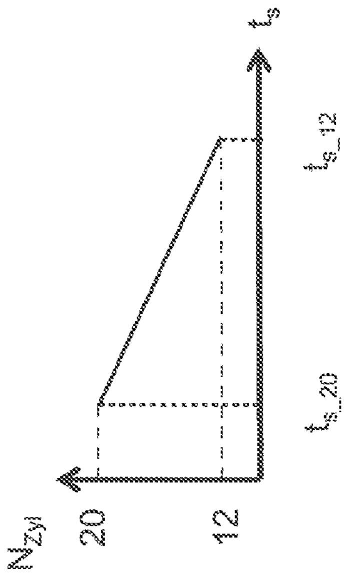
FIGS. 3*a* and 3*b* are diagrams showing the graphic representation of calculation of the starting time.
Figure 3B:
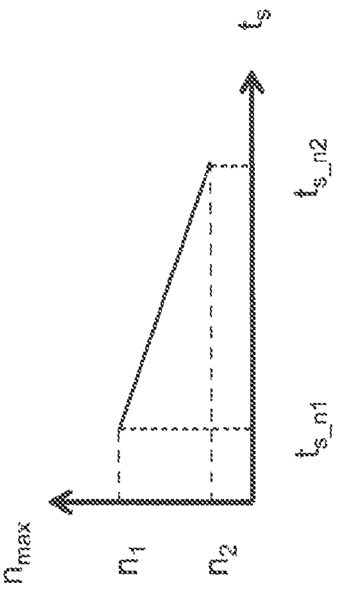

FIGS. 3*a* and 3*b* show a graphic illustration of the calculation of the set starting time $t_s$ in accordance with an embodiment.

For the purposes of terminology clarification it is emphasized that an internal combustion engine 1 is the generic term. That embraces different engine series which differ for example by virtue of different capacities of the piston-cylinder units 2. Within the engine series, there are in turn various types which differ by the number of piston-cylinder units 2. An engine series can therefore include engines with different numbers of cylinders, but the size (volume) of the individual piston-cylinder units 2 within an engine series is substantially the same.

Now firstly for an engine series which can include types with different numbers of cylinders, a reference starting time $t_{ref}$ is ascertained for a type with a given number of cylinders.

In the present example, the reference starting time $t_{ref}$ is determined for a type with 20 cylinders. In addition, a starting time is determined for a type with a different number of cylinders, for example 12 cylinders. The starting time for the type with 12 cylinders is divided by the reference starting time $t_{ref}$. The result of that division is the factor for taking account of the number of cylinders, being the $factor_{cyl}$.

That relationship is shown in graph form in FIG. 3*a*. The graph of FIG. 3*a* plots the number of cylinders $N_{zyl}$ in relation to the set starting time $t_s$. It will be seen that the engine with 20 cylinders has a shorter starting time, $t_{s\_20}$, than the engine with 12 cylinders, $t_{s\_12}$.

The factor $factor_{cyl}$ therefore reproduces the above-discussed relationship, that with the same rotary speed the dead volumes 3 are pumped out more quickly with a larger number of cylinders.

In the illustrated example, the starting time ascertained for the engine type with 12 cylinders was 1.27 times as long as for the type with 20 cylinders, that is to say in this specific example the $factor_{cyl}$ is 1.27. The factor $factor_{cyl}$ can naturally assume a different value for other engine series.

Furthermore, the influence of the starting speed is taken into consideration, by way of a second factor. That is shown in graph form in FIG. 3*b*. To determine the factor for taking account of the starting rotary speed, two starting procedures are performed on the same engine with a different starting speed. With a higher starting speed, a shorter starting time is achieved.

In FIG. 3*b* the maximum starter speed $n_{max}$ is plotted in relation to the set starting time $t_s$. It will be seen that, with a higher starter speed $n_1$ a shorter starting time $t_{s\_n1}$ is achieved, than for the lower starter speed $s_2$ with which the starting time $t_{s\_n2}$.

The ratio of the starting time for the lower starting speed by the starting time for the higher starting speed gives the factor for taking account of the starting speed, $factor_{nmax}$. That reproduces the above-discussed relationship whereby the dead volumes 3 are more rapidly pumped out at a higher speed of revolution.

The maximum permissible required starting time $t_{max}$ for a selected internal combustion engine 1 is now calculated with the following formula:

$$t_{max}=t_{ref}\cdot factor_{cyl}\cdot factor_{nmax}$$

Once the relationship between the number of cylinders or the maximum starter speed is known by a reference measurement, it is possible to calculate for any number of cylinders and starting speeds with the factors $factor_{cyl}$ and $factor_{nmax}$ within an engine series.

In accordance with a variant, the starting time can be calculated by way of the following formula.

The volume flow from the induction manifold 6 to the piston-cylinder units 2 is identified by $V'_{Zyl}$ and has $m^3/s$ as its unit. The volume flow $V'_{Zyl}$ results as the product from:

$$V'_{Zyl} = \frac{1}{2} * n_{max} * N_{Zyl} * \lambda_L$$

with nmax as the maximum starter speed, $N_{zyl}$ as the number of cylinders, $V_{zyl}$ as the swept volume of a cylinder and $\lambda_L$ as the ratio of the real and theoretical gas exchange of a cylinder (volumetric efficiency). The formula therefore reproduces the volume flow that the piston-cylinder units 2 require at a speed of revolution of $n_{max}$ from the induction manifold. These are parameters which are known for a type of engine.

The volumetric efficiency $\lambda_L$ specifies how much fresh charge is available in relation to the theoretically maximum possible filling after the conclusion of a charge exchange in the cylinder. It will be appreciated that a larger swept volume provides a greater pump action and thus a greater volume flow $V'_{Zyl}$.

The starting time $t_s$ can now be calculated as follows:

$$t_s = V_{intake} / V'_{Zyl}$$

with $V_{intake}$ being the spatial content of the dead volumes 3 in $m^3$.

LIST OF REFERENCES USED

1 internal combustion engine
2 piston-cylinder units
3 dead volumes
4 starter ring
5 auxiliary motor
6 induction manifold
7 fuel feed device
$factor_{nmax}$ factor for taking account of the starting speed
$factor_{cyl}$ factor for taking account of the number of cylinders
$t_{max}$ maximum permissible required starting time
$t_s$ starting time
$n_{max}$ maximum starter speed
$n_s$ starting speed
$N_{zyl}$ number of cylinders
$V_{intake}$ spatial content of the dead volumes 3 in $m^3$
$\lambda_L$ ratio of real and theoretical gas exchange of a cylinder (volumetric efficiency)

The invention claimed is:

1. A method of starting an internal combustion engine, comprising:

providing the internal combustion engine having a plurality of piston-cylinder units, and dead volumes between combustion chambers of the plurality of piston-cylinder units and a fuel metering device or a mixing device upstream of the combustion chambers;

calculating a set starting time prior to or at a start of an attempt at starting the internal combustion engine based on a state of at least one of the internal combustion engine and an auxiliary motor, the start of at least one of the internal combustion engine and the auxiliary motor comprising a size of the dead volumes;

driving pistons in respective cylinders by the auxiliary motor during the attempt at starting the internal combustion engine, a maximum permissible duration of the attempt at starting restricted by the set starting time of the internal combustion engine; and stopping the attempt at starting the internal combustion engine if a rotary speed of the internal combustion engine determined by a speed of the auxiliary motor, has not reached or exceeded a starting rotary speed of the internal combustion engine upon expiration of the set starting time.

2. The method as set forth in claim 1, wherein the state of at least one of the internal combustion engine and the auxiliary motor further comprises a rotary speed of the auxiliary motor.

3. The method as set forth in claim 1, wherein the state of at least one of the internal combustion engine and the auxiliary motor further comprises a quantity of cylinders of the internal combustion engine.

4. The method as set forth in claim 1, wherein the state of at least one of the internal combustion engine and the auxiliary motor further comprises a swept volume of the piston-cylinder units of the internal combustion engine.

5. The method as set forth in claim 1, wherein the state of at least one of the internal combustion engine and the auxiliary motor further comprises a volumetric efficiency of the internal combustion engine.

* * * * *